United States Patent [19]

Stolz

[11] Patent Number: 4,594,275

[45] Date of Patent: Jun. 10, 1986

[54] ELONGATED COLUMNAR OR ROD-LIKE STRUCTURE, AND METHOD OF ITS MANUFACTURE

[75] Inventor: Gerd Stolz, Oberheinriet, Fed. Rep. of Germany

[73] Assignee: Winfried Matter, Forst, Fed. Rep. of Germany

[21] Appl. No.: 633,585

[22] Filed: Jul. 23, 1984

[30] Foreign Application Priority Data

Aug. 4, 1983 [DE] Fed. Rep. of Germany ....... 3328146

[51] Int. Cl.⁴ .............................................. B32B 1/08
[52] U.S. Cl. ...................................... 428/36; 428/188;
428/377; 428/397; 156/166; 156/187; 156/192;
156/196; 156/296; 156/304.2; 280/756
[58] Field of Search .............. 156/166, 296, 185, 187,
156/192, 196, 295, 304.2; 428/36, 398, 399, 188,
377, 397

[56] References Cited
FOREIGN PATENT DOCUMENTS 7114991 7/1971 Fed. Rep. of Germany .
2426015 12/1975 Fed. Rep. of Germany .

Primary Examiner—Alexander S. Thomas
Attorney, Agent, or Firm—Frishauf, Holtz, Goodman & Woodward

[57] ABSTRACT

To form a columnar or rod-like or bar-like material, a plurality of canes, for example of glass, plastic, or metal, are assembled in openings, for example in the form of circumferential grooves (3) in a plurality of base bodies (2), spaced along the length of the columnar opening; after assembly, a bonding or curing agent such as an epoxy is located between the canes, and in the grooves of the base bodies, and the assembly is then wrapped with a wrapping, of textile woven or mesh or braid material, which may include metal-mesh, the epoxy then curing and bonding the canes, spaced holding elements, bonding agent and web material into one unitary whole. Branches can be formed by bending off selected ones of the canes, and any termination configuration is obtained by sliding the canes in the openings prior to curing of the bonding agent.

21 Claims, 12 Drawing Figures

ELONGATED COLUMNAR OR ROD-LIKE STRUCTURE, AND METHOD OF ITS MANUFACTURE

The present invention relates to a columnar or rod-like or bar-like material or structure, and method of its manufacture, and more particularly to such a structure and method in which the cross section of the material can be freely selected, and which, additionally, permits branching of the columnar structure to form, for example, branched columns or side branches therefrom essentially integral with the columnar or bar-like or rod-like structure.

BACKGROUND

It has previously been proposed to make rod-like material or tubular material by assembling canes adjacent each other, and retaining the canes in a predetermined cross-sectional shape by wrapping the canes with an external wrapping or roving material. German Utility Model Publication No. 71 14 991, published July 15, 1971, describes a hollow structure in which a plurality of reinforcing rods in the form of glass fiber canes are first placed within depressions of a metal core, forming a mandrel, the canes then are wrapped with a glass-fiber roving, which includes a curable epoxy. After preliminary curing of the epoxy, the metal core or mandrel is removed—it is not stated how—and what is left will be the glass-fiber wrapping, longitudinally reinforced by the reinforcing glass fiber canes then located internally of the cured glass fiber wrap, now tubular structure. It has also been proposed—see German Patent Disclosure Document DE-OS No. 24 26 015—to form a hollow body by locating longitudinal stabilization strips surrounding an extruded inner tube, the stabilization strips being located uniformly distributed about the circumference and having glass-fiber-reinforced plastic positioned between the stabilization strips. In order to form a closed outer circumference, glass-fiber tapes or bands, with a hardenable compound, are then wrapped about the rods placed circumferentially around the inner extruded tube. The entire assembly is then permitted to cure or harden.

Rod-like material is frequently required in many fields of industry, and it is often necessary to assemble rod-like or columnar material longitudinally to obtain longer lengths than those first delivered or available, or to cut predetermined lengths of material from long rods or columns. It is also frequently necessary to provide columnar material with laterally extending branch elements. In accordance with the prior art, the rod-like material must, then, be cut to length or, if to be extended, in case of metal to be welded together. Cutting to length, longitudinally extending by welding, and/or branching, requires frequently slanting and often complicated cuts which substantially increases the cost of manufacture of a given rod-like or columnar or bar-like structure, particularly if lateral branches are also needed. Matching the specific structure and its shape to particular requirements is often expensive and time-consuming, and the requisite technology of joining connecting elements requires skill and patience, and hence expense to the user.

THE INVENTION

It is an object to provide a rod-like or columnar material which can be easily matched to design requirements of specific applications with respect to length, branches and the like, and which can be readily assembled, for example on-the-job, and can be supplied in modular or kit form, so that application to any desired purpose can be readily carried out. Further, the material should be such that force transfer, for example weight-carrying capability, is readily adaptable to various uses—all at minimum cost and with only low requirements regarding particular assembly and machining or handling skills.

Briefly, a plurality of base bodies which have the desired cross-sectional shape of the rod-like or columnar material are provided, the base bodies being formed at their outer circumference with longitudinal openings, e.g. grooves. Canes having the cross section to fit the grooves are inserted in the grooves. The base bodies are spaced from each other by suitable distances, in dependence on the weight-carrying distribution and on design requirements. The grooves receiving the canes are so arranged and constructed that, for example, more than one cane can be placed into a groove. Longitudinal dimensions can be obtained by placing canes of the required length in the grooves, with the base bodies spaced sufficiently from each other to retain the canes in predetermined location without, however, unduly multiplying the number of base bodies to reduce the overall cost. To extend the length of one such unit, it is then only necessary to place additional canes in the grooves adjacent the already placed canes, with suitable base bodies further along the length of the additional canes. Some of the canes, then, will be located adjacent each other; the canes can also be hollow, so as to be telescopically received within each other.

After the requisite length of the element is determined, the entire assembly has a curable bonding agent, for example an epoxy compound, placed between the canes, and particularly around the canes in the grooves of the base bodies. Thereafter, the entire assembly is wrapped with a tape or web, typically of textile material—which may be a metal textile mesh—also retaining or soaked in the curable bonding compound, so that, upon hardening or curing thereof, the base bodies, canes—individually or telescoped within or adjacent each other—will form one continuous structure, the web taking up forces counter-acting bulging of the canes in regions between the base bodies, and maintaining the cross-sectional shape, as determined by the base bodies themselves.

The grooves formed in the base bodies, preferably, extend parallel to the longitudinal extent of the columnar or rod-like structure. They should be large enough to permit longitudinal shifting of the canes therein; they may be circular, so that the canes, for example, can also be rotated. After the rod has the requisite shape and length, for example by inserting and embedding extension canes with additional base bodies, the curable or hardenable compound is applied to the canes which, then, are tightly wrapped with an outer wrapping in order to fix the canes with respect to each other and within the holding bodies.

It is also possible to insert canes only into alternate grooves, for example, of the base body, so that longitudinal extension is possible by then placing additional canes in the previously empty or free grooves of a base body. In such an arrangement, the grooves are preferably so made that the canes fit snugly therein, permitting longitudinal sliding, and, if desired, rotation if the grooves and canes are of essentially circular cross section.

The structure has the advantage that the cross-sectional shape of the columnar or rod-like or bar-like material can be readily determined by suitably shaping the base bodies, and to extend the length in accordance with any desired dimension by inserting additional canes in for example alternate grooves of the base bodies.

The structure has the additional advantage of substantial versatility. For example, if an inclined end portion is desired, it is simple to so slide the canes with respect to each other in the base bodies that the end surface will have any desired configuration, for example inclined or transversely semicircular or curved, for example concave to receive a circular cross element Merely sliding the canes within the base bodies permits any terminal shape.

Branching can be easily effected by fitting canes from one element or structure, in which not all of the grooves or not all of the space in the grooves of the base bodies are filled with canes from an adjacently located structure, which are bent to fit into the remaining grooves or the remaining space within oversized grooves. These structures can be so arranged that the canes from one branch, for example, pass between the spaces of the canes of another branch.

The canes can be of different material or of different color. Other elements may be passed into the structure, for example by deflecting the canes in the position between the holding elements to form eyes, in which, for example, canes of an attachment branch could be introduced. The cross section of the columnar element need not remain the same throughout its length, and a tapered structure can easily be made by suitably spacing the grooves formed in successive holding elements to be closer and closer together; or to terminate some canes in grooves of holding elements, and continue the remaining canes for subsequent holding elements of smaller cross section, with the same spacing of the grooves to receive the canes which continue to the next holding element.

In accordance with a feature of the invention, the canes are individually longitudinally shiftable, and, preferably, also individually rotatable, to permit for bending of the structure before the bonding agent has cured or set, so that the structure can assume any desired shape deviating, for example, from a straight line. When assembling a plurality of caned structures, for example by making branches, it is preferred to first form the caned structure and only thereafter apply the bonding agent and the wrapping which will be saturated with bonding agent during the wrapping process, if it has not been saturated with bonding agent before. Upon curing and hardening of the bonding agent, then, the canes will be secured and fixed in position with respect to each other, as well as with respect to the holding bodies, to form a unitary whole. Any adjustment can be carried out, even after wrapping, if done before the bonding agent has cured or set, so that any final adjustment, for example to fit a predetermined shape or other structural requirement, can be accomodated even after wrapping of the columnar material.

In accordance with a feature of the invention, the holding bodies are formed with bores through which the canes are inserted or threaded. Assembly can be simplified, however, if, in accordance with a feature of the invention, the openings are located at the periphery of the holding bodies, for example with slightly resiliently overlapping teeth or ears, so that the canes can be snapped into the openings from the outside, and not requiring threading. This results in an overall structure which is easily made, for example of plastic, and rapidly and easily assembled, requiring only a minimum of skill on part of the assembling operator.

The holding bodies can be made essentially of any material, such as metal, wood, or plastic, for example a polyamide. The holding bodies, thus, can be made by injection-molding, immediately ready for the desired shape, for example with peripheral openings permitting snap-in attachment of the canes, and with the requisite resiliency; polyamide is particularly desirable and provides for good bonding with commercial bonding agents.

The canes may be made of any desired material as well; for example, the canes can be metal rods, glass fibers or other materials; or they can be mixed, by using different materials, preferably, however, having an essentially uniform thermal coefficient of expansion if subjected to temperature swings. It is particularly simple to provide, for example, alternately canes of metal and canes of glass-fiber material—to thus arrive at a structure which can readily be joined or made longer by adding canes, as above described—thus resulting in a structure which previously could only be made shorter, but not extended, since glass-fiber-metal combinations cannot be welded.

The canes may have any desired cross section; circular or polygonal cross section, for example hexagonal or square, are preferred shapes. The openings in the holding bodies should be matched to the cross section of the canes. If the openings in the holding bodies are circular, or at least Part-circular, and the canes likewise have a circular cross section, the canes are rotatable so that they can be turned to any desired position which is particularly desirable when making end portions of the overall structure which are other than planar and flat. Using canes of polygonal cross section, for example square or hexagonal, prevents rotation of the canes, if such is desired. Other shapes, of course, may be used, for example canes which have one circumference which is curved, to match, for example, a round cross section, while other surfaces of the canes are part-polygonal to fit within matching openings in the holding bodies while preventing rotation of the canes.

The surrounding wrapping preferably is a textile material; it may be a woven tape or band, knitted tape or band, a braid or any other textile material made of glass fiber, plastic or other man-made fibers or filaments. The wrapping may, also, be made of a metal strapping, or, for example, of a metal weave or woven sleeve, or metal textiles, if such is desired due to weight carrying and load distributing capabilities.

DRAWINGS

DETAILED DESCRIPTION

Figure 1:
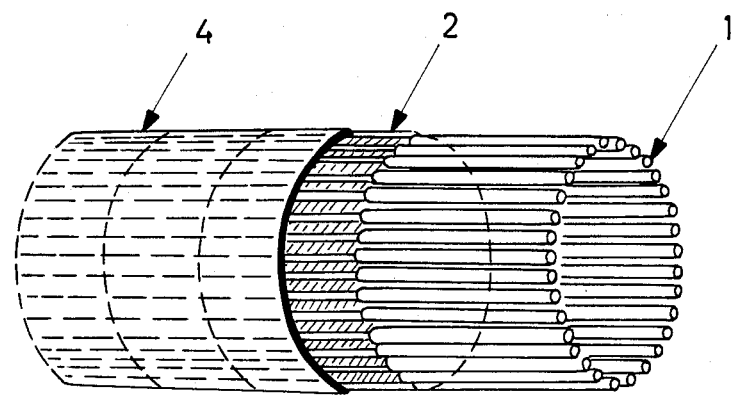
FIG. 1 is a fragmentary perspective view of the rod-like material and having circular cross section.
Figures 2A, 2B:
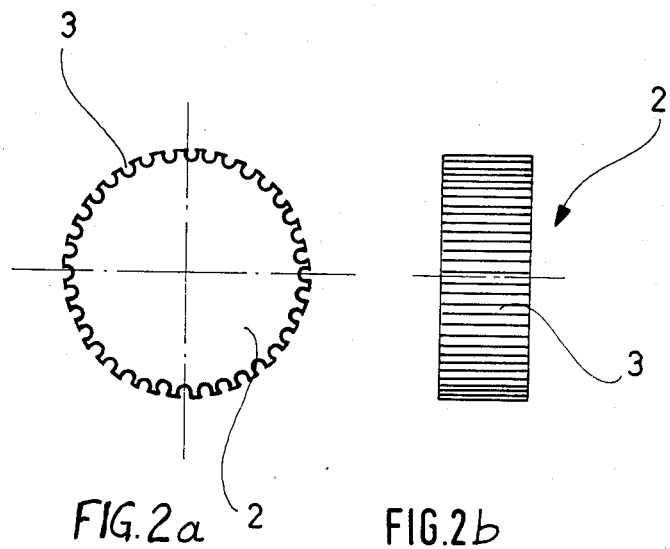
FIGS. 2a and 2b illustrate, respectively, a top view and a side view of a circular holding element for use in the rod of FIG. 1.

The columnar material shown in FIG. 1 is formed of longitudinally extending canes 1, which are snap-fitted into openings 3 (FIG. 2a) of holding elements 2, located at suitably spaced positions along the length of the rod-like element. The canes are snap-fitted into the openings 3, which are open towards the outer circumference, as best seen in FIG. 2a. The canes 1 are distributed in more or less dense sequence over the length of the rod—of which only a portion is shown—and the number of canes used will depend on the weigh carrying capability which the rod-like or columnar material is intended to have. The canes are of circular cross section and, hence, rotatable within the open grooves 3 of the holding elements 2. They are longitudinally slidable in the respective holding elements.

The length of the material will depend on the length of the canes 1, and the number of canes which are fitted, for example, end-to-end, on any one holding element, or interlaced, for example in the space between two holding elements, in alternate grooves 3 of the holding elements. To make the rod-like material, the canes are assembled, in the present instance snapped into the openings 3, and, when the desired shape and size is reached, a bonding agent is applied to the canes and also to the canes in the regions of the holding bodies or elements 2, to penetrate around the canes and into the grooves 3. The canes may be brought into the desired shape, for example by bending the structure as desired, spreading-apart canes between adjacent holding elements or holding bodies, or the like. After the canes and holding elements are assembled, and the shape of the rod-like or columnar body is determined, for example by bending, spreading of canes or the like, a bonding agent is applied to the canes, especially in the region where the canes are in the grooves 3, to penetrate around the canes and into the grooves 3, and, then, an outer wrapping, typically a web, braiding, or the like, is applied thereover. The wrapping 4 may be, for example, of fibrous material, such as glass fibers, metal fibers, plastic fibers or the like, and, upon wrapping, the bonding agent penetrates between the canes 1, and into the wrapping material. The wrapping material, canes, and base bodies 2, where positioned, then will form a tight unitary connection. Upon curing of the bonding agent, the canes no longer will be axially slidable or shiftable in the holding bodies 2, and the axial position of the holding bodies 2 likewise will be unvaryingly determined. The canes will no longer be able to deflect laterally, for example radially, due to the wrapping 4, and will be tightly retained on the holding bodies 4, where positioned thereover.

FIG. 3 (collectively) shows a holding body 5 with openings 7 at the circumference of a half-elliptical or half-oval cross section.

Figures 3A, 3B:
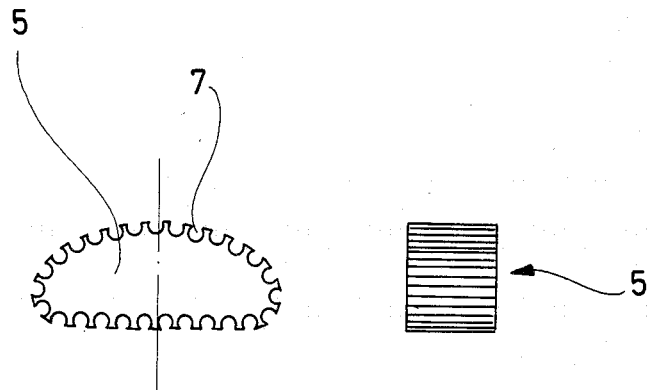
FIGS. 3a and 3b illustrate, respectively, a top view and side view of another type of holding element.
Figures 4A, 4B:
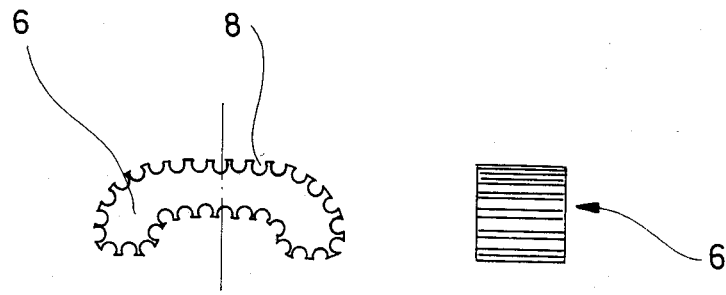
FIGS. 4a and 4b illustrate, respectively, a top view and side view of yet another type of holding element, resulting in a flat, double-bent columnar or bar-like or rod-like material.

FIG. 4 (collectively) shows a holding body 6 with peripheral openings 8 of generally U-shaped cross section. These Figures are presented to show the versatility and merely to give two examples of cross sections which have found demand. Any other cross sections, such as L-shaped, U-shaped or channel-shaped, or the like, of course can be provided. Assembly of longitudinal rods of the cross sections of FIGS. 3a and 4a is identical to that described in connection with FIGS. 1 and 2a.

The method and apparatus are highly versatile with respect to junctions of the rod-like or columnar material with other similar materials or other structural elements.

Figure 5:
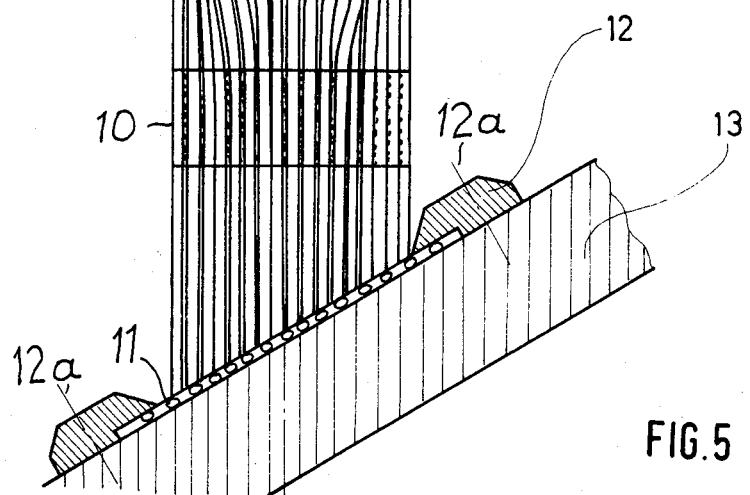
FIG. 5 illustrates a rod-like or columnar material with an inclined connecting end, a lateral branch connection, and a holding loop.

FIG. 5 is a side view of rod-like material before wrapping. Holding elements 10, of which only two are shown, have canes 11 fitted therein. The holding elements 10 may, for example, be of circular, polygonal, or any other desired cross section. The lower ends—with respect to FIG. 5—of the canes 11 are radially, outwardly bent over—as seen at 11 with respect to one cane only, to result in a flared, flange-like appearance of the canes. The structure is then readily connected to an inclined structural element 13 by a clamping ring 12 which is clamped to the laterally extending flange-like bent-over cane portions 11 by clamping screws, shown only schematically, by their center lines 12a.

FIG. 5 makes it clear that the canes can be attached to any structural element 13 of different or any desired inclination, if assembled prior to applying the bonding agent and the wrapping. By permitting longitudinal shifting of the canes, the inclination of the structural element can be varied; thus, the canes 11, assembled to the holding bodies 10, can be flared outwardly, clamped by the ring 12, and the inclination of the structural element 11 adjusted thereafter, the longitudinal portions of the canes 11 sliding in the holding elements 10. Thus, a prior fitting of the inclined terminating portions of the canes with respect to any particular angle of the structural element 13 is not necessary; the canes can be fitted to any desired angle as they are being installed. Thus, the canes may be applied, as seen in FIG. 5, to an angular structure 13 which, for example, forms an angle of between 30° or 40°, even, with the vertical position of the canes 11. An inclined cut, which is difficult to carry out with a solid or tubular rod without a special miter or similar angle cutting gauge, is not necessary.

FIG. 5 illustrates another feature of the structural body of the present invention. By slightly bending the canes 11 outwardly, a connecting bushing 14, for example with an internal thread, can be fitted between the canes. To insert the sleeve or bushing 14, adjacent holding elements 10 are first axially spread apart, so that the somewhat elastic canes 11 can readily be shifted sideways for insertion, for example, of a bushing 14, with an internal thread, or with an inner extending washer bent to match the diameter of the rod-like structure. After bending apart the canes 11, and insertion of the bushing or sleeve, the holding elements 10 are again shifted towards each other, so that the sleeve 14 is retained by the canes 11 in clamped position, similar to holding in a circumferential vise. Thus, the penetrating element 14, typically a sleeve or bushing or pipe element, is held in position to prevent loosening or shifting upon application of bonding agent and the wrapping about the canes.

FIG. 5 illustrates yet another feature of the invention: The canes can be pulled out, singly or in a group, to form a loop 15. This loop can readily be formed prior to wrapping of one or more of the canes 11, and is then available, for example, for later attachment of a hanger, or for retaining within the loop another holding element. If desired, the loop portion 15 can be individually wrapped, so that one or more canes are protected and also embedded in the bonding agent and surrounded by the wrapping.

Figure 6:
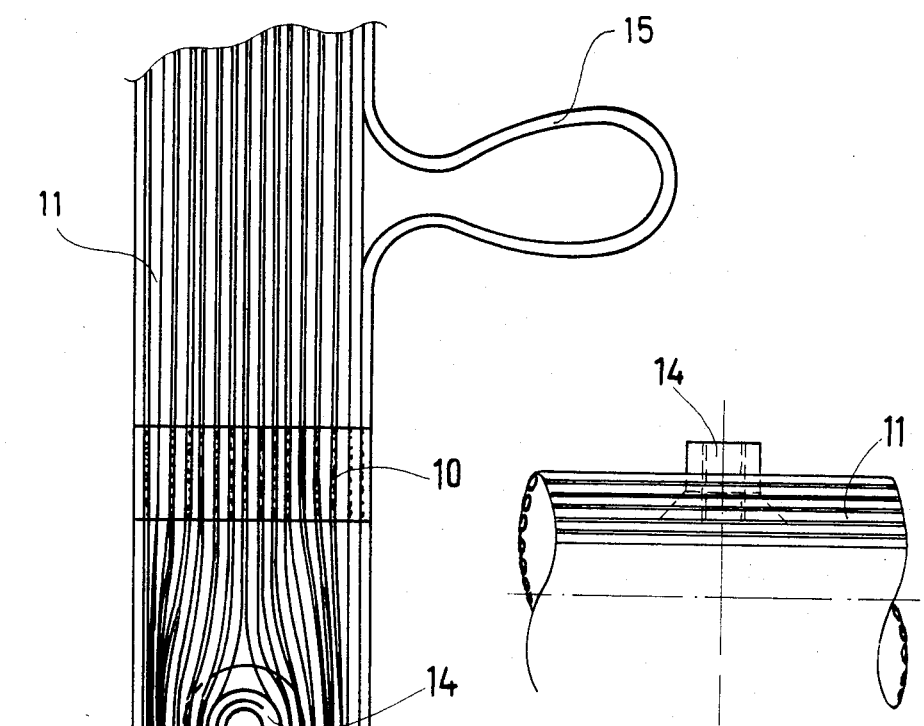
FIG. 6 is a fragmentary side view illustrating connection of a lateral stub.

FIG. 6 is a part-phantom side view of the structure of FIG. 5, drawn with circular cross section, in the region of the connecting bushing 14. The bushing 14 extends radially outwardly from the group of canes, so that it will be exposed and not be covered during wrapping of the canes. The wrapping material may be placed around the bushing 14 or, when passing thereover, suitably slit or cut to accomodate the projecting portion of the bushing 14. As shown, the bushing 14 is formed with an internal washer or collar or extension, and is internally threaded, for example for attachment to a threaded pipe. This structure is particularly suitable, for example, for electrical conduits to place branch lines through the bushing 14. The canes can, primarily, be of glass or insulating material, except for one or a few, which can be of metal, and thus form a ground conductor. The base bodies may be annular, e.g. have a central opening.

Figure 7:
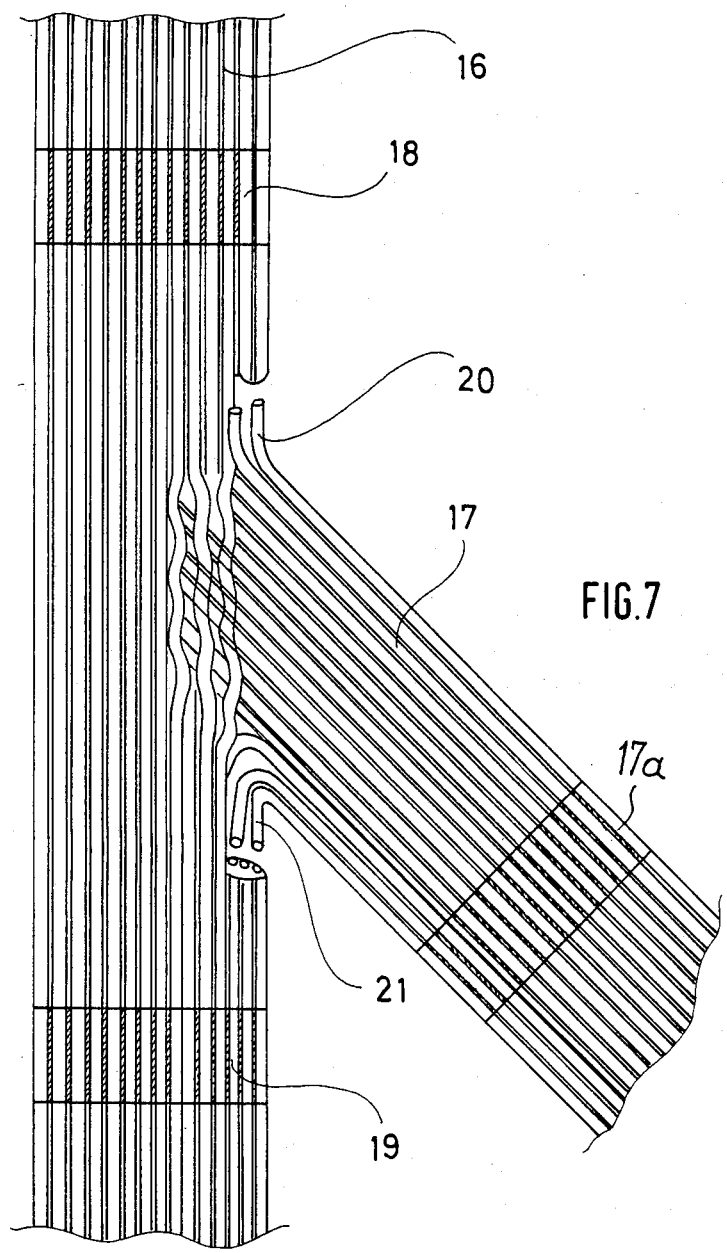
FIG. 7 illustrates connection of two rod-like elements and interfitting and interlacing of canes thereof.

The rod-like or columnar material is particulary suitable for use in which the column is to branch. FIG. 7 illustrates a base column 16 with a branch 17, which may extend from the base column 16 at any desired angle. In manufacture, the canes of the branch 17 are placed between the canes of the column 16, to penetrate the column formed by these canes, and, for example, to position the canes from branch 17 in alternate grooves or free grooves of the holding elements 18, 19. As previously described, assembly is preferably carried out by first spreading apart the holding bodies or elements 18, 19, assembling the canes of branch 17 thereto, and then pushing the holding elements 18, 19 towards each other, so that the previously described vise gripping effect is obtained. The canes of branch 17 may, also, be fitted within end portions of the canes of the column 16, if the canes of column 16 are hollow; alternatively, the grooves of the holding bodies 18, 19 can be large enough to accomodate two canes adjacent each other. Square or hexagonal canes are particularly suitable for such an arrangement. After assembly of the branch, which has its own holding body 17a, placement of the canes 20, 21 in the holding elements 18, 19, and then pushing the elements 18, 19 towards each other, the assembly is covered with bonding agent and then wrapped. The wrapping has been omitted from FIG. 7 for clarity. The canes are bent, as shown at the cane ends 20,21 in any desired direction. The fixed connection is insured by the interaction of the obtuse angle formed by the bend 20 with respect to the acute angle formed by the ends 21 of the canes.

FIG. 7 illustrates also another possibility of branching: For example, the canes of column 16 could be separated to form a Y-connection in which the branch 17 has a different profile from that of the column 16. Thus, the cross-sectional profile of the holding element 17a may be entirely different, for example as shown in FIGS. 3 and 4 (collectively) rather than of the same profile, e.g. circular (FIG. 2) of the holding elements 18, 19. By branching some of the canes from between the holding elements 18, 19 in the direction of the branch 17, no junction or interlacing of canes from the branch 17 to the holding elements 18, 19 becomes necessary; this is particularly suitable if the canes of the column 16 are densely placed together, and the cross-sectional area of the branch 17 is substantially smaller, so that, for example, only every third or fourth cane appearing in the column beyond the holding elements 18, 19 will be branched to the branch 17.

Figure 8:
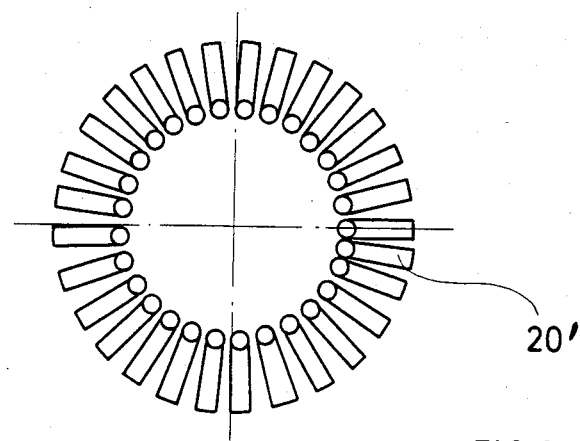
FIG. 8 is a top view of the end of a rod-like structure with bent-over canes.
Figure 9:
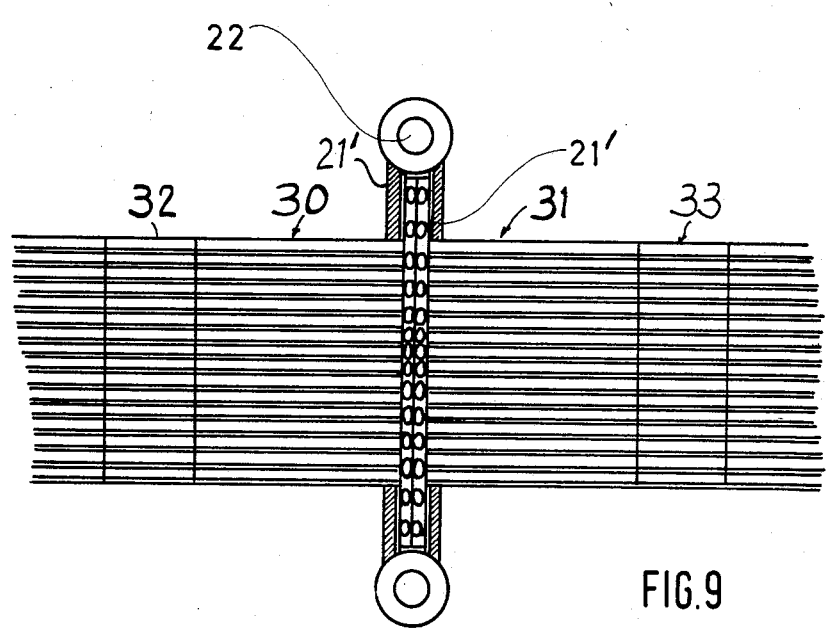
FIG. 9 illustrates a flange connection of two canes with bent-over ends in accordance with FIG. 8.

Longitudinal splicing of columnar or rod-like material is readily possible by inserting canes butted against each other at the respective holding elements or by telescoping canes—if some of them are hollow, at least in part—or by placing canes adjacent each other in adjacent or enlarged openings of the holding bodies or holding elements. In accordance with another feature of the invention (see FIGS. 8 and 9), two columnar or rod-like elements can be connected in flange-like manner. The canes at one end of the rod-like material are, for example, bent over at right angles to form radially extending tines 20'. The tines 20' are then clamped by washer plates 21' which are held together by either longitudinally extending suitably spaced screws or by a clamping ring 22, for example forming a screw or clamping connection.

The connection of the rod-like portions 30, 31 (FIG. 9), each with a holding element 32, 33, by bending over the tines 20', is preferably done before the canes have the bonding agent applied thereto. After assembly of the canes and holding elements in the shape shown in FIG. 9, a bonding agent is applied to the canes, to the grooves in the holding elements 32, 33, and, preferably, also to the tines 20'. The washers 21' are then assembled, as shown and the wrapping—not shown in FIG. 9—is then applied over the canes and the holding elements 32, 33, the wrapping extending up to, and possibly around and over—for example by a slit—the flange formed by the washers 21' and the clamp connection connecting the washers 21' together. After curing, the columnar or rod-like structure of parts 30, 31 will have become a unitary whole.

The structural element, as shown, and the method of its manufacture permits many applications. One suitable application, for example, is a roll-bar for a motor vehicle, in which a branching connection, for example towards the trunk or in longitudinal direction of the vehicle is desired. Other applications, particularly suitable in the automotive industry, are the connections of structural elements within the body of a motor vehicle, which are required to be attached together to form a monocoque construction, and which, in the past, required complex connections between longitudinal and cross elements. They can be pre-assembled, for example, all made of suitably dimensioned canes, wrapped and bonded together, and, if desired, bent before installation for subsequent curing with the then desired shape, thus permitting installation in uncured state, for example by fitting around obstacles which require difficult installation steps if the unit is originally stiff before its installation.

Various changes and modifications may be made, and any features described herein may be used with any of the embodiments within the scope of the inventive concept.

When used, for example, as a roll-bar for a motor vehicle, a suitable material for the holding bodies 2 is reinforced polyamide.

The canes 1, suitably, are spring steel.

A suitable diameter for such a structure, if circular, is 40 mm.

The spacing of holding elements 2 from each other, for such a structure, is variable.

A suitable bonding agent is epoxide-resin.

A suitable wrapping material 4 is high tension fibre (C-fibres).

In general, it is desirable that the longitudinal dimension of the holding bodies has a ratio to its diameter of about 5 mm to 40 mm, and that the holding bodies are spaced from each other by about 0 till 5 times the diameter, or largest cross-sectional distance thereof.

I claim:

1. Columnar or rod-like or bar-like material of a selected cross section comprising
    a plurality of base bodies (2, 5, 6, 10, 17a, 18, 19, 32, 33) of the selected cross-sectional shape, the base bodies being formed with longitudinal openings (3, 7, 8) adjacent the circumference thereof;
    a plurality of canes (1, 11) located in the openings and being slidably positioned therein, the base bodies being spaced along the length of the material, leaving gaps therebetween along which only the canes extend;
    a bonding agent embedding the canes and in the openings of the base bodies; and
    a wrapping (4) of a tape or web-like material wrapped about the canes in the regions of the openings and bonded to the canes and, where present, to the base bodies by the bonding agent.

2. Material according to claim 1, wherein the openings are circular, and the canes have circular cross section, said canes being slidable and rotatable within the openings.

3. Material according to claim 1, wherein a plurality of canes (1) are located in any one opening (3, 7, 8).

4. Material according to claim 1, wherein the openings are bores (3a) extending within the base body (2a) adjacent the circumference thereof.

5. Material according to claim 1, wherein the openings are peripheral grooves (3, 7, 8) formed within the surface of the holding elements.

6. Material according to claim 5, wherein the peripheral grooves have overlapping edges slightly smaller than the outer size of the canes, the edges being resilient to permit snap-in connection of the canes into the openings.

7. Material according to claim 1, wherein the base bodies comprise a plastic.

8. Material according to claim 7, wherein the base bodies comprise polyamide.

9. Material according to claim 1, wherein the canes comprise metal rods.

10. Material according to claim 1, wherein the canes comprise composite fiber bundles comprising at least one of the materials of the group consisting of: metal; glass; plastics.

11. Material according to claim 1, wherein the canes have polygonal cross section; and
    the openings in the base bodies have a shape matching the polygonal cross section of the canes.

12. Material according to claim 1, wherein the wrapping comprises a woven, knitted or braided textile material comprising at least one of the materials of the group consisting of: glass; metal; plastics.

13. Structural component (FIG. 7) having a main branch (16) and a lateral branch (17) comprising
    two base bodies (18, 19) positioned, spaced from each other, in the main branch;
    at least one base body (17a) positioned in the lateral branch;
    said base bodies being formed with longitudinal openings adjacent the circumference thereof;
    a first group of canes located in at least some of the openings of one of the base bodies (18, 19) in the main branch;
    a second group of a plurality of canes located in some of the openings of the other one of the base bodies (18) of the main branch, and being bent from the direction of the main branch laterally, and extending into the openings of the base body in the lateral branch; and
    a further group of canes being located in some of the openings of the other one of the base bodies of the main branch, and deflected from the direction of the main branch towards the lateral branch (17) and being located in the openings of the base body (17a) in the lateral branch;
    a bonding agent embedding the canes in the openings of the base bodies, and positioned around the canes; and
    a wrapping of tape or web material wrapped about the canes of the main branch as well as around the canes of the lateral branch, and bonded to the canes, and, where located, to the base bodies essentially throughout the entire length of said structure.

14. Component according to claim 13, wherein the openings form circumferential grooves formed in the base bodies.

15. Method of making a columnar or rod-like or bar-like material of a selected cross-sectional shape comprising
    providing a plurality of base bodies (2, 5, 6, 8, 17a, 18, 19, 32, 33) having the desired cross-sectional shape;
    forming longitudinal openings adjacent the outer circumference of the base bodies;
    inserting canes (1, 11) in the longitudinal openings, the canes having a cross section which, at least in part, fits into the openings, positioning the base bodies spaced from each other, the base bodies holding the canes in position in the openings, and hence in position with respect to each other;
    applying a curable or hardenable bonding agent to the canes and to the base bodies, while penetrating the openings, to embed the canes in the bonding agent; and
    wrapping a tape or web-like wrapping about the bonding agent and embedding the canes prior to curing of the bonding agent to bond the tape or web to the canes and to the region of the base bodies; and
    and permitting the bonding agent to cure.

16. Method according to claim 15, wherein the step of forming the longitudinal openings comprises forming longitudinal grooves in the outer circumference of the base bodies, and the step of applying the bonding agent comprises embedding the canes, prior to curing of the bonding agent, in the grooves; and
    and the step of wrapping the tape comprises wrapping the tape or web about the bonding agent to embed the bonding agent, and the canes, prior to curing of the bonding agent together, the tape or web also embedding the circumference of the base bodies in the region between the openings thereof in the bonding agent.

17. Method according to claim 16, wherein the step of wrapping the tape or web comprises wrapping a textile material of woven, knitted or braid form, and comprising a material of the group consisting of: glass; plastics; metals.

18. Method according to claim 16, wherein the step of forming the longitudinal grooves comprises forming the grooves with slightly overlapping edges, and the step of inserting the canes comprising snapping the canes into the openings, by resiliently deflecting the overlapping edges.

19. Method according to claim 15, in which said material includes a lateral extending portion (14, 17), said method further including the step of locating the laterally extending portion (14) between the canes in a region between base bodies;

spacing the two base bodies (10; 18, 19) from each other by a distance sufficient to permit deflection of the canes around the lateral element;

inserting the lateral element between the deflected canes; and then pushing the two base bodies (10; 18, 19) towards each other to lock the canes in position around the lateral element by sliding said base bodies along the length of the canes inserted in the longitudinal openings.

20. Method according to claim 19, wherein the lateral element comprises a plurality of canes branched from and inserted in adjacent base bodies (18, 19); and including the step of positioning a branch base body (17a) formed with longitudinal openings adjacent its circumference around the branched canes by receiving the canes in the longitudinal openings of the branch base body.

21. Method according to claim 15, further including the step of sliding the canes relative to each other after insertion in the respective base body and prior to curing of the bonding agent, and shaping the orientation and geometry of said material in a desired form after said step of wrapping of the tape or web-like wrapping about the canes and prior to curing of the bonding agent; and permitting the bonding agent to cure after the material has been given the desired geometrical shape or outline.

* * * * *